United States Patent
Harris et al.

(10) Patent No.: US 9,100,531 B1
(45) Date of Patent: *Aug. 4, 2015

(54) METHOD AND APPARATUS FOR PERFORMING ROBUST CADENCE DETECTION IN A VIDEO DEINTERLACER

(71) Applicant: Altera Corporation, San Jose, CA (US)

(72) Inventors: Jon Michael Harris, North Stoke (GB); Vivek Gowri-Shankar, Wheatley (GB); Boon Hong Oh, Pulau Pinang (MY)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/533,694

(22) Filed: Nov. 5, 2014

Related U.S. Application Data

(62) Division of application No. 13/558,673, filed on Jul. 26, 2012, now Pat. No. 8,902,358.

(51) Int. Cl.
*H04N 7/01* (2006.01)
*H04N 11/20* (2006.01)

(52) U.S. Cl.
CPC ............. *H04N 7/014* (2013.01); *H04N 7/0115* (2013.01)

(58) Field of Classification Search
USPC ........... 348/441, 419.1, 439.1, 443, 445, 446, 348/448, 449, 451, 452, 453, 454, 456, 459, 348/490, 550, 667, 700, 704
See application file for complete search history.

(56) References Cited

U.S. PATENT DOCUMENTS

| | | | |
|---|---|---|---|
| 6,992,727 B2 | 1/2006 | Lin et al. |
| 7,215,380 B2 | 5/2007 | Lin et al. |
| 7,557,861 B2 | 7/2009 | Wyman |
| 8,004,607 B2 | 8/2011 | Eymard et al. |
| 8,243,195 B2 | 8/2012 | Eymard et al. |
| 8,264,605 B2 | 9/2012 | Shin et al. |
| 8,619,187 B2 | 12/2013 | Garg et al. |
| 8,836,858 B1 | 9/2014 | Harris et al. |
| 2002/0171759 A1 | 11/2002 | Handjojo et al. |
| 2004/0119890 A1 | 6/2004 | Lin et al. |
| 2004/0207752 A1 | 10/2004 | Lin et al. |
| 2005/0168634 A1 | 8/2005 | Wyman et al. |
| 2005/0168653 A1 | 8/2005 | Wyman |
| 2007/0291169 A1 | 12/2007 | Eymard et al. |

OTHER PUBLICATIONS

U.S. Appl. No. 14/454,062, filed Aug. 7, 2014, in Re Application of Harris, et al.
U.S. Appl. No. 13/558,673, filed Jul. 26, 2012, in Re Application of Harris, et al.

*Primary Examiner* — Jefferey Harold
*Assistant Examiner* — Mustafizur Rahman
(74) *Attorney, Agent, or Firm* — L. Cho

(57) ABSTRACT

A deinterlacing apparatus includes a buffer to receive a plurality of consecutive fields of an interlaced video and a field combination module coupled to the buffer to deinterlace the interlaced video in accordance with cadence of the interlaced video. The deinterlacing apparatus also includes a cadence detection module to detect the cadence by (1) causing each of the fields to be combined with its preceding field into a frame and with its subsequent field into another frame to obtain a plurality of combined frames, (2) determining a comb factor of each of the combined frames to obtain a sequence of comb factors of the combined frames, and (3) determining if the sequence of comb factors of the combined frames follows a pre-determined repeating pattern. A cadence detection method is also described.

20 Claims, 10 Drawing Sheets

METHOD AND APPARATUS FOR PERFORMING ROBUST CADENCE DETECTION IN A VIDEO DEINTERLACER

RELATED APPLICATION

This application is a divisional of and claims priority and benefit to U.S. application Ser. No. 13/558,673 filed on Jul. 26, 2012, entitled, "Method and Apparatus for Performing Robust Cadence Detection in a Video Deinterlacer".

TECHNICAL FIELD

Embodiments of the present invention relate to video deinterlacing. More specifically, embodiments of the present invention relate to a method and apparatus for performing robust cadence detection in a video deinterlacer.

BACKGROUND

An interlaced video is a succession of approximately 50 or 60 fields per second with each of the fields carries only the alternating rows displayed in each frame of the video. FIG. 1 shows an interlaced video clip with panning. Interlaced video is often derived from motion picture film materials photographed in a 24 or 30 frames-per-second progressive manner for display on cathode ray tube (CRT) type of displays. Interlacing is generally performed to achieve bandwidth reduction, but results in a reduced picture display quality. However, since the reduction in picture display quality from interlacing is not very noticeable on CRT displays, interlacing has been used as an elementary compression technique for CRT displays.

As most of today's digital television displays require progressive video inputs video materials in the interlaced format need to be converted to a progressive video format in order to be properly displayed on the digital TV displays. This process is referred to as deinterlacing. One typical deinterlacing technique is known as field combination (or weaving) which simply combines the appropriate fields together to restore the original images in the case where one original frame is used to generate two fields.

To weave the correct fields together, the deinterlacer detects cadence of the interlaced video. Cadence generally refers to a pattern of successive fields that correspond to the frames of the original video (i.e., conversion pattern). If the cadence cannot be properly detected, the deinterlacer will not be able to properly weave the correct fields together and may discard video data erroneously.

The detection of cadence may be complex and difficult. For example, motion picture film is typically progressive and is based on 24 frame-per-second sequence while the NTSC format for TV broadcast is 60 fields per second. To convert a motion picture film into an interlaced video in NTSC format, a 3:2 pull-down repeating cadence is used to generate three fields from one film frame and two fields from the next film frame. In addition, sometimes every twelfth field is dropped to accelerate the film and fit the film within a given time slot. This loss results in a 3:2:3:2:2 repeating cadence.

Moreover, although the 3:2 repeating cadence is the most common format, other repeating cadences (e.g., 2:2, 2:3:3:2, and 3:3) may also be used to interlace the progressive original film. Furthermore, it is possible that an interlaced video may have one portion of the video interlaced with a 3:2 cadence while having another portion of the interlaced video converted with a different cadence (e.g., 2:2 or 3:3). It is also possible that an interlaced video does not have any cadence.

False detection of cadence may occur when two fields that were not generated consecutively are weaved together. 2:2 cadence is another common format. This often originates where film destined for television broadcast in phase alternating line (PAL) or sequentiel couleur a memoire (SECAM) formats is photographed at 25 frames per second and is broadcast at 50 fields per second, where each frame is the progenitor of an odd and even field. 2:2 cadence is also common for television broadcast in National Television System Committee (NTSC) format where a show has been photographed at 30 frames per second and then broadcast at 60 fields per second.

SUMMARY

According to an embodiment of the present invention, a deinterlacing apparatus includes a buffer to receive a plurality of consecutive fields of an interlaced video and a field combination module coupled to the buffer to deinterlace the interlaced video in accordance with the cadence of the interlaced video. According to one embodiment of the present invention, the deinterlacing apparatus also includes a cadence detection module to detect the cadence by (1) causing each of the fields to be combined with its preceding field into a frame and with its subsequent field into another frame to obtain a plurality of combined frames, (2) determining a comb factor of each of the combined frames to obtain a sequence of comb factors of the combined frames, and (3) determining if the sequence of comb factors of the combined frames follows a pre-determined repeating pattern.

According to another embodiment of the present invention, a motion adaptive deinterlacer includes (1) a motion detector to detect motion in an interlaced video that includes a plurality of consecutive fields and (2) a field extension deinterlacing module to deinterlace the interlaced video if the motion detector detects motion in the interlaced video. The motion adaptive deinterlacer also includes a field combination deinterlacing module to deinterlace the interlaced video if the motion detector does not detect motion in the interlaced video and if cadence of the interlaced video is detected. The field combination deinterlacing module includes a cadence detection module to detect the cadence by (1) causing each of the fields to be combined with its preceding field into a frame and with its subsequent field into another frame to obtain a plurality of combined frames, (2) determining a comb factor of each of the combined frames to obtain comb factors of the combined frames in sequence, and (3) determining if the sequence of comb factors follows a pre-determined repeating pattern. In the case where the motion detector does not detect motion in the interlaced video and the cadence detection module does not detect cadence, the fields are weaved together.

According to yet another embodiment of the present invention, a method of detecting cadence of an interlaced video receives a plurality of consecutive fields of the interlaced video which are combined into a plurality of combined frames such that each of the fields is combined with its preceding field into a frame and with its subsequent field into another frame to ensure that each of the fields is included in two adjacent combined frames. A comb factor of each of the combined frames is then determined to obtain a sequence of comb factors of the combined frames. If the sequence of comb factors of the combined frames follows a pre-determined repeating pattern, then detection of the cadence is declared. The interlaced video is then deinterlaced in accordance with the detected cadence using field combination.

BRIEF DESCRIPTION OF THE DRAWINGS

The features and advantages of the present invention are illustrated by way of example and are by no means intended to limit the scope of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
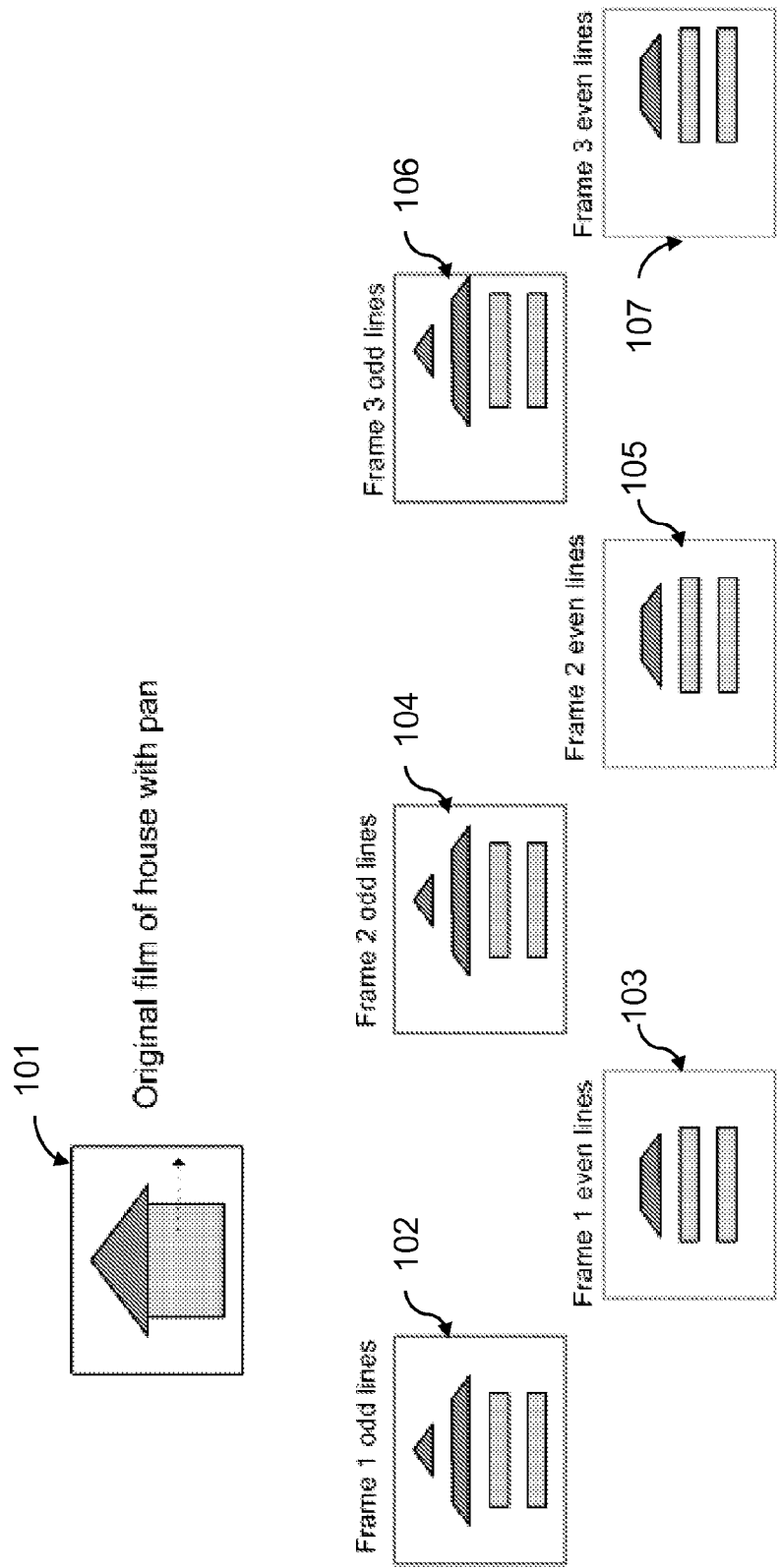
FIG. 1 is a prior art illustration of an interlaced video.
Figure 2:
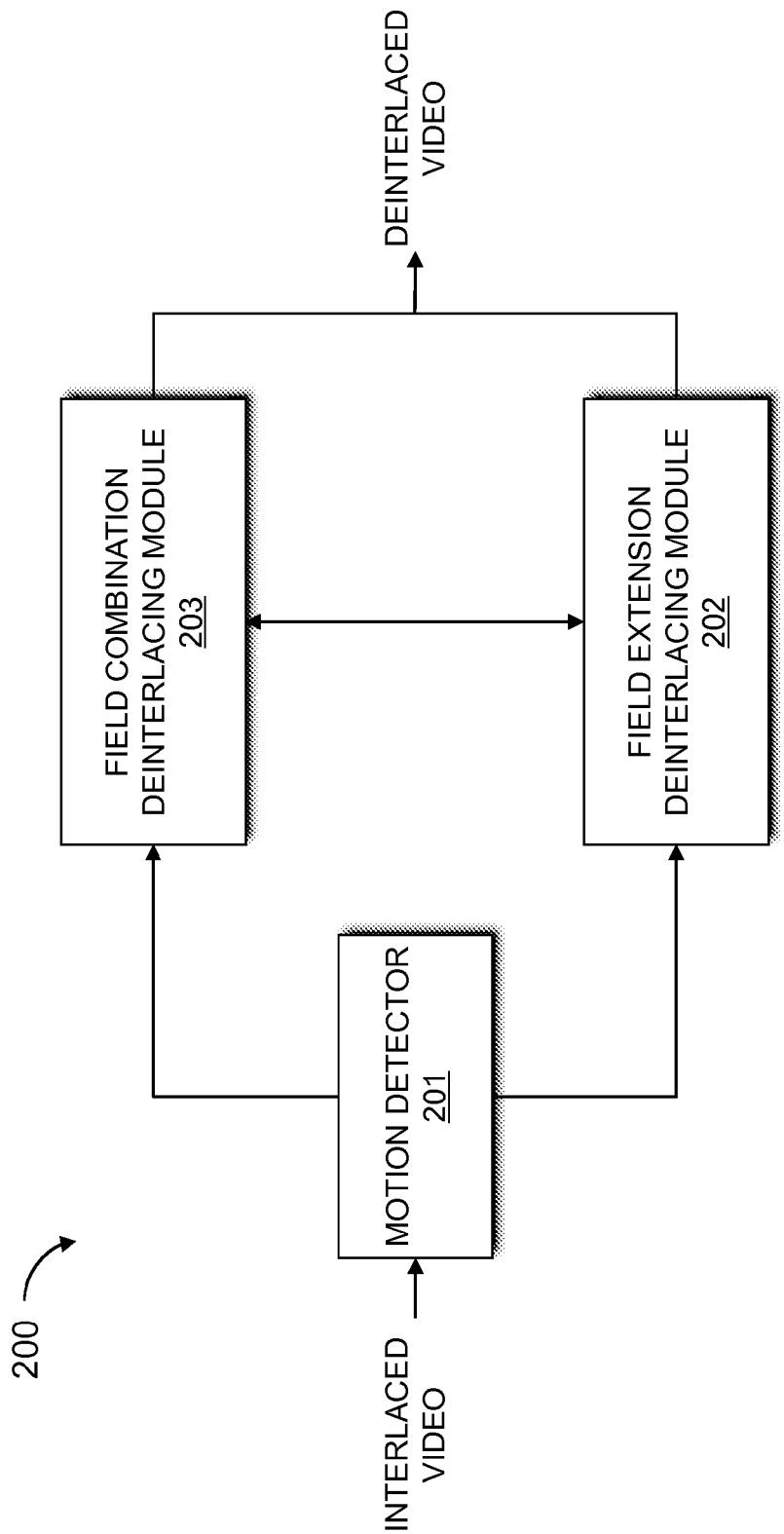
FIG. 2 illustrates a motion adaptive deinterlacer that includes a field combination deinterlacing module according to an exemplary embodiment of the present invention.

FIG. 2 is a block diagram of a motion adaptive deinterlacer 200 that includes a motion detector 201, a field extension deinterlacing module 202, and a field combination deinterlacing module 203 according to an exemplary embodiment of the present invention. According to an embodiment of the present invention, the field combination deinterlacing module 203 includes a cadence detection module (see FIG. 3) that detects cadence of an interlaced video applied to the deinterlacer 200.

According to one embodiment of the present invention, the cadence detection module employs a two-field-pair comparison cadence detection scheme to robustly detect the cadence of the interlaced video. One aspect of this two-field-pair comparison cadence detection scheme is to calculate or obtain two comb factor values for every incoming video field, one between the current field and its preceding field and the other between the current field and a subsequent field. In addition, only like line-types are compared to calculate the comb factors.

The cadence detection module in the field combination deinterlacing module 203 combines a field (also referred to as current field) of the interlaced video with its preceding adjacent field (also referred to as past or preceding field) into a frame (also referred to as current frame). In addition, the cadence detection module combines the current field with its subsequent adjacent field (also referred to as next or subsequent field) into another frame (also referred to as future frame). The current frame is also the future frame for the preceding field when classified as the current field. The future frame is also the current frame for the subsequent field when that field is later classified as the current field. This frame making process is repeated for a number of fields of the interlaced video to obtain or produce a plurality of combined frames.

According to one embodiment of the present invention, the cadence detection module determines a comb factor of each of the combined frames in sequence to obtain a sequence of comb factors of the combined frames. The sequence of comb factors tracks the sequence of the combined frames. The comb factor of each of the combined frames is the accumulated comb factor values of all the pixels within the frame. The comb factor value for each frame may be high (indicating inappropriate fields weaved together) or low (indicating appropriate fields weaved together). The cadence detection module then determines if the sequence of comb factors follows a low-high-low-high (or high-low-high-low) pattern for a number of times (i.e., threshold times). If the repeating pattern is detected by the cadence detection module for more than the threshold times, the cadence detection module declares the detection of a 2:2 cadence. This two-field-pair comparison cadence detection scheme is robust and is less likely to erroneously lock to non-cadenced video sequences, because the scheme calls for the comparison of the current field with both the past field and the next field. The deinterlacer 200 and its cadence detection module in accordance with embodiments of the present invention will be described in more detail in conjunction with FIGS. 2 through 10.

Throughout the specification, the follow terms are defined as follows.

The term "film", "motion picture film", or "movie" refers to a sequence or series of still or moving photographic images recorded by cameras on film stock.

The term "video" refers to a sequence of image frames that are electronically captured, recorded, processed, stored, transmitted, and/or reconstructed. Like film, video has a frame rate, which refers to the number of frames per second. Video is displayed on electronic analog displays (e.g., CRT display) or electronic digital displays.

Video can be interlaced or progressive. The term "interlace" (or "interlacing" or "interlaced") refers to the process of splitting a video frame into consecutive video fields, namely an odd field and an even field. The odd field includes all the odd-numbered horizontal scan lines within the video frame and the even field includes all the even-numbered horizontal scan lines within the video frame. The odd field can also be referred to as upper field and the even field can also be referred to as lower field. Thus, an interlaced video includes a sequence of video fields.

On the other hand, a progressive video includes a sequence of video frames that can be displayed on progressive scan display systems (e.g., digital TV display or digital projector). The progressive scan display system updates all of the scan lines of each frame in sequence in each refresh period. When displaying a natively progressive broadcast or recorded signal, the display result is optimum spatial resolution of both the stationary and moving parts of the image. When displaying a natively interlaced signal, however, overall spatial resolution will be degraded by simple line doubling and artifacts such as "staircasing of diagonals" effects and lost resolution of images will be seen unless more sophisticated deinterlacing is applied to eliminate them. However, "combing" artifacts may result if the deinterlacing applied is a simple deinterlacing technique that incorrectly or erroneously combines fields together.

The term "combing" or "combing effect" indicates comb-shaped (or saw-tooth-like) patterns that are caused by alternate lines in a frame being slightly displaced from each other, thus resulting in jagged edges. The combing effect can be caused by many factors. For example, motion of subjects between video fields causes combing effect in that the slight differences between two fields due to the motion will make the alternate lines displaced from each other from frame to frame. As another example, combining or weaving improper fields together will result in combing effect in the improperly combined frame.

The term "comb factor" refers to a value indicating whether there are more combing effects in a combined frame than permitted by a predetermined threshold. Thus, the comb factor is an accumulated metric for the combing values of all the pixels in the frame. The comb factor can have a "high" indication when the accumulated combing values of a frame exceed the predetermined threshold, and have a "low" indication when the accumulated combing values of the frame do not exceed the predetermined threshold.

The term "cadence" refers to a pattern of successive fields that correspond to the frames of the original video (i.e., conversion pattern). Cadence is used in the telecine process for converting movie content to video format, as well as in the process of restoring the interlaced video to the original frame sequence. Cadence indicates (1) the original format from which the interlaced video is derived, (2) frame rate conversion, if any, and (3) whether the interlaced video is an originally generated video (e.g., from a video camera). If the cadence cannot be properly detected from an interlaced video (or if cadence is not present in the interlaced video), the fields of the interlaced video will not be properly combined or weaved together. It should be appreciated, however, that a cadence need not necessary be present in an interlaced video.

Cadence detection is part of field combination deinterlacing which restores an interlaced video back to the original progressive frame sequence using field combination or weaving techniques. The deinterlacing can be used to reverse the telecine process that converted movies into interlaced video back into the progressive scan sequence. In order to properly apply the correct deinterlacing procedure, the deinterlacer must determine and detect the cadence of the interlaced video.

Referring to FIG. 2, the deinterlacer 200 receives an interlaced video and deinterlaces the video into a deinterlaced video. In one embodiment, the deinterlacer 200 can be implemented using a single processing device or a plurality of processing devices. Such a processing device may be a microprocessor, co-processors, a microcontroller, digital signal processor, microcomputer, central processing unit, field programmable gate array (FPGA), programmable logic device, state machine, logic circuitry, analog circuitry, digital circuitry, and/or any device that manipulates signals (analog or digital) based on operational instructions that are stored in a memory device. Such a memory device can be a single memory device or multiple devices and can include a hard disk drive or other disk drive, read-only memory, random access memory, volatile memory, non-volatile memory, static memory, dynamic memory, flash memory, cache memory, and/or any device that stores digital information. It is to be noted that when the processing module implements one or more of its functions via a state machine, analog circuitry, digital circuitry, and/or logic circuitry, the memory storing the corresponding operational instructions may be embedded within, or external to, the circuitry including the state machine, analog circuitry, digital circuitry, and/or logic circuitry.

In another embodiment, the deinterlacer 200 is implemented in software form. In alternate embodiments, the deinterlacer 200 may be implemented in firmware form. In this case, the deinterlacer 200 is a circuit design template created using an electronic design automation tool. The circuit design template can then be finalized with user specified circuit parameters and is then programmed or implemented on an FPGA or other physical programmable target device. In an alternative embodiment, the deinterlacer 200 may be implemented using a combination of hardware, software, and/or firmware.

The deinterlacer 200 may reside in or be used with a video device (not shown in FIG. 2). The video device can be a digital TV display, a digital video recorder, a digital video player, a video receiver, a computer, a monitor, a smart phone, a tablet computer, a video projector, or any other electronic device with video processing and display functions.

The field extension deinterlacing module 202 of the deinterlacer 200 is employed to deinterlace the interlaced video when the interlaced video includes motion (i.e., moving objects) in the video fields. The field extension deinterlacing module 202 performs the deinterlacing function by extending the lines in each field to the entire screen into a complete frame. There are many field extension deinterlacing techniques that the field extension deinterlacing module 202 can employ to deinterlace the interlaced video. For example, the deinterlacing technique employed by the field extension deinterlacing module 202 may be half-sizing which displays each field on its own, resulting in a video frame with half the vertical resolution of the original frame. Another field extension deinterlacing technique used by the field extension deinterlacing module 202 is line doubling which doubles the lines in each of the interlaced video fields into a complete frame. A further field extension deinterlacing technique used by the field extension deinterlacing module 202 includes interpolation which uses spatial filtering to generate extra lines. These techniques and the structure and functions of the field extension deinterlacing module 202 are all known and will not be described in more detail below.

The motion detector 201 is used to detect motion in the incoming interlaced video sequence. If motion is detected, the motion detector 201 directs the field extension deinterlacing module 202 to deinterlace the interlaced video. If motion is not detected, the motion detector 201 directs the field combination deinterlacing module 203 to deinterlace the interlaced video. In one embodiment, the motion detector 201 includes a line buffer (not shown) to receive and buffer fields of the interlaced video for motion detection. In other embodiments, the line buffer may be implemented using other means (e.g., memory, cache, or registers).

The motion detector 201 buffers several of the fields of the interlaced video and may use a technique such as edge detection to find or detect motion between the fields. It should be appreciated that other techniques such as Sum of Absolute Differences ("SAD") may be performed to find or detect motion where a sum of absolute differences is taken across multiple fields. The structure and the motion detection function of the motion detector 201 can be implemented using known means and thus will not be described in more detail below.

The field combination deinterlacing module 203 of the deinterlacer 200 is employed to deinterlace the interlaced video when the fields of the interlaced video are static or stationary (i.e., the image has not changed between fields and/or do not include motion). The field combination deinterlacing module 203 performs the deinterlacing function by combining the lines in adjacent odd and even fields together to form a frame. There are many field combination deinterlacing techniques that the field combination deinterlacing module 203 may employ to deinterlace the interlaced video. For example, the deinterlacing technique employed by the field combination deinterlacing module 203 may be weaving which adds consecutive fields (i.e., odd and even) together. Another field combination deinterlacing technique used by the field combination deinterlacing module 203 is blending which blends or averages consecutive fields to be displayed as one frame. Both weaving and blending are known field combination techniques and will not be described in more detail below.

The use of the motion detector 201 and the field extension deinterlacing module 202 in addition to the field combination deinterlacing module 203 allows the deinterlacer 200 to ensure that the best picture quality of the deinterlaced video sequence is obtained. The motion detector 201 achieves this by detecting or predicting the direction and the amount of image motion between consecutive fields. In one embodiment, based on the detection result, the motion detector 201 either invokes the field extension deinterlacing module 202 or the field combination deinterlacing module 203 to deinterlace the interlaced video. In another embodiment, the motion detector 201 invokes the field extension deinterlacing module 202 and the field combination deinterlacing module 203 to deinterlace a given frame if the motion detector 201 detects motion in the fields of a given frame. In this case, the field extension deinterlacing module 202 is invoked to deinterlace the motion portions within the frame while the field combination deinterlacing module 203 is invoked to deinterlace the static portions within the frame. In a further embodiment, the field extension deinterlacing module 202 includes both the field extension deinterlacing function and the field combination deinterlacing function so that the field extension deinterlacing function is invoked to deinterlace the motion portion within a given frame while the field combination deinterlacing function is invoked to deinterlace the static portions of the frame. Thus, with the motion detector 201, the deinterlacer 200 can perform motion adaptive deinterlacing to the interlaced video.

To perform the deinterlacing function, the field combination deinterlacing module 203 analyzes incoming interlaced video, detects the cadence of the incoming interlaced video, and then combines or weaves the incoming fields in the correct order to recreate the progressive video. To detect the cadence, the field combination deinterlacing module 203 includes a cadence detection module (not shown). In accordance with one embodiment, the cadence detection module implements the two-field-pair comparison cadence detection scheme to robustly detect the cadence of the interlaced video by calculating two comb factor values for every incoming video field, one between the current field and its preceding field and the other between the current field and a subsequent field. In addition, only like line-types are compared to calculate the comb factors. The cadence detection module then determines the comb factor of each of the combined frames in sequence to obtain a sequence of comb factors of the combined frames. The sequence of comb factors tracks the sequence of the combined frames. The comb factor value for each frame can be high (indicating inappropriate fields weaved together) or low (indicating appropriate fields weaved together). The cadence detection module then determines if the sequence of comb factors follows a low-high-low-high (or high-low-high-low) pattern for a number of times (i.e., threshold times). If the repeating pattern is detected by the cadence detection module for more than the threshold times, the cadence detection module declares the detection of a 2:2 cadence. If no cadence can be detected or if the interlaced video does not include cadence, then the cadence detection module invokes the field extension deinterlacing module 202 to deinterlace the interlaced video. The structure and operation of the cadence detection module in accordance with one embodiment of the present invention will be described in more detail below, also in conjunction with FIGS. 3-7. It should be appreciated that the deinterlacer 200 illustrated in FIG. 2 illustrates an exemplary embodiment of the present invention and may include other types of deinterlacing components.

Figure 3:
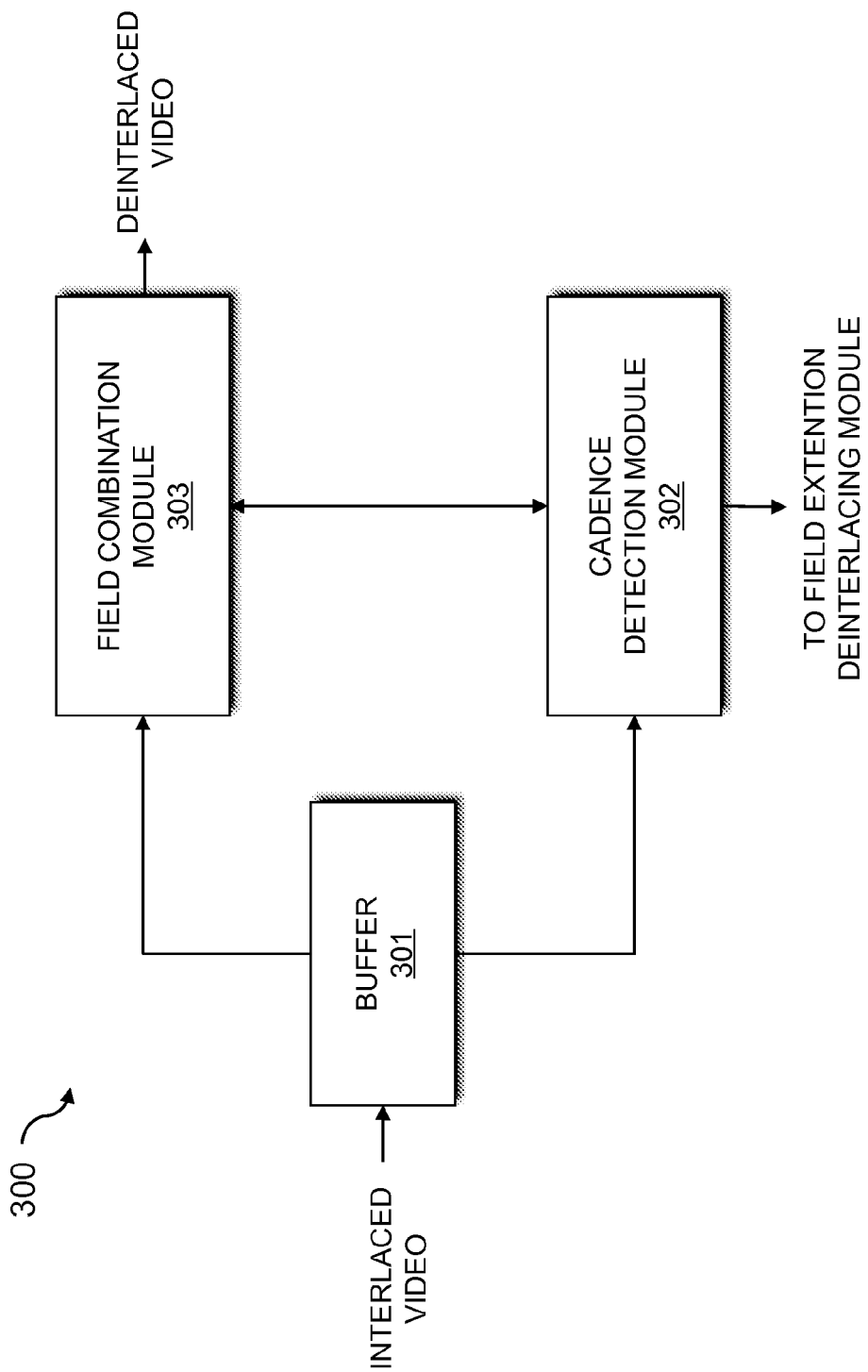
FIG. 3 illustrates a field combination deinterlacing module that includes a cadence detection module according to an exemplary embodiment of the present invention.

FIG. 3 illustrates a field combination deinterlacing module 300 according to an exemplary embodiment of the present invention. The field combination deinterlacing module 300 may be used to implement the field combination deinterlacing module 203 of the deinterlacer 200 of FIG. 2. As can be seen from FIG. 3, the field combination deinterlacing module 300 also includes a buffer 301 and a field combination module 303. The buffer 301 is used to receive and buffer the incoming fields of the interlaced video. The buffer 301 is connected to the field combination module 303 and a cadence detection module 302. The field combination module 303 is used to combine consecutive and adjacent fields together under the direction of the cadence detection module 302 to produce the deinterlaced video.

In one embodiment, the buffer 301 is implemented by a line buffer in a motion detector (i.e., the motion detector 201 of FIG. 2). Alternatively, the buffer may be implemented using a memory. In a further embodiment, the buffer 301 may be integrated in either the field combination module 303 or the cadence detection module 302.

The received fields in the buffer 301 are consecutive in time and are adjacent to each other. At any given time point, the fields include a current field (i.e., current with respect to the giving time point) and a preceding field (prior to the current field at the giving time point) which is immediately adjacent to the current field. The fields also include a subsequent field which immediately follows the current field and is adjacent to the current field.

The field combination module 303 combines adjacent odd and even fields together to form a frame. There are many field combination techniques that the field combination module 303 may employ. In one embodiment, the field combination technique employed is weaving which adds consecutive fields (i.e., odd and even) together. In another embodiment, the field combination technique used by the field combination module 303 is blending which blends or averages consecutive fields to be displayed as one frame. It should be appreciated that in other embodiments, blending is not performed.

The cadence detection module 302 employs the two-field-pair comparison cadence detection scheme to robustly detect the cadence of the interlaced video. First, the cadence detection module 302 obtains a sequence of combined frames from the interlaced video fields in the manner that each field is included in two combined frames. In this case, the cadence detection module 302 starts the function by identifying a field as the first current field. The cadence detection module 302 then obtains a preceding adjacent field (also referred to as past or preceding field) of the current field to combine them into a current frame. In addition, the cadence detection module 302 causes the current field to be combined with its subsequent adjacent field (also referred to as next or subsequent field) into another frame (also referred to as future or next frame).

The cadence detection module 302 then moves to obtain the next combined frame pair for the next current field by classifying the subsequent field as the current field. It is to be noted that in this case, the current frame for the new current field is the same as the next frame of the last current frame. Thus, there is no need to obtain the current frame for the new current field. Only the next frame is produced and added to the combined frame sequence. The cadence detection module 302 causes this frame making process to repeat a number of times. In other words, for an interlaced video with N fields, a sequence of N+1 combined frames is produced.

In one embodiment, the cadence detection module 302 causes the field combination module 303 to produce the combined frames. In another embodiment, the cadence detection module 302 includes its own field combination module that implements the field combination function.

The cadence detection module 302 then calculates or obtains the comb factor value of each of the combined frames. The comb factor is an accumulated metric for the combing values of all the pixels in the frame. This means that the comb factor is an accumulated indication of the combing effect of the combined frame. The comb factor can have a high value and a low value. The high value comb factor indicates that the combined frame has more combing effects resulted from either motion in the fields or combining incorrect fields together to form the frame. The low value comb factor indicates that the combined frame has less or no combing effect in the frame.

In one embodiment, the cadence detection module 302 calculates the comb factor as follows. For each pixel in a line, the cadence detection module 302 determines if the value of that pixel falls outside the range of a vertically interpolated pixel value. If it is determined that the value falls outside the range, then a high combing value is logged for that pixel (meaning displacement of the pixel that resulted in combing effect for that pixel). If the cadence detection module 302 determines that the value does not fall outside the range, then a low combing value is logged for that pixel. The interpolated pixel value is obtained by interpolating the pixel in question with its vertically adjacent pixels (i.e., a pixel above the pixel in question and a pixel below the pixel in question).

Once the combing value of all the pixels along the line has been calculated, the combing values for the next line of pixels are calculated using the above described procedure until all the pixels within the image frame have been processed. After this is completed, the cadence detection module 302 accumulates all the high combing values to determine the comb factor of the image frame. In one embodiment, a comb count is generated for each line. If that line comb count exceeds a threshold, then a frame comb count is incremented. The frame comb count is accumulated for the whole frame and used to determine comb factor of the image frame. In other embodiments, other ways of determining the comb factor of an image frame can be used.

If the accumulated comb factor value exceeds a pre-determined threshold, then the cadence detection module 302 assigns a high comb factor value for the frame. This indicates that the frame has high collective combing effect. If the accumulated comb factor value does not exceed the threshold, then the cadence detection module 302 assigns a low comb factor value for the frame. This indicates that the collective combing effect of the frame is either very low or the frame does not have any combing effect. The cadence detection module 302 then adds the comb factor value for the frame to a comb factor sequence count to accumulate the length of the sequence, and then continues the comb factor calculation for the next combined frame. In one embodiment, the count itself is not recorded and is discarded. Only the Boolean fact as to whether the frame count (i.e., the combing values of the frame) was "high" or "low" is recorded. The sequence of comb factors tracks the sequence of the combined frames. According to an alternate embodiment of the present invention, the comb factor of the image frame may be determined by generating a comb count for each line and incrementing the comb count if the line comb count exceeds a threshold. This latter count is accumulated for a whole frame and used to determine cadence.

Once the comb factor sequence has reached or exceeded a pre-determined threshold length, the cadence detection module 302 determines if the comb factor sequence includes a repeating pattern of high-low-high-low (or low-high-low-high). If that is the case, a 2:2 cadence is detected. If not, then no 2:2 cadence is detected.

The pre-determined threshold length can be, for example, ten times (i.e., ten comb factor value pairs). A longer pre-determined threshold length will make the cadence detection more reliable, but will also mean a longer latency in the detection.

Once the cadence is declared detected, the cadence detection module 302 invokes the field combination module 303 to combine or weave the fields into progressive frames in accordance with the detected cadence. If no cadence is declared detected (meaning the interlaced video is a non-cadenced video), the cadence detection module 302 may deinterlace the interlaced video by invoking the field extension deinterlacing module (shown in FIG. 2) It should be appreciated, however, that alternatively, a non-cadence video of a static image may be "weaved". This two-field-pair comparison cadence detection scheme performed by the cadence detection module 302 is robust and is less likely to erroneously lock to non-cadenced video sequences, because the scheme calls for the comparison of the current field with both the past field and the next field.

The cadence detection module 302 can be implemented in software, hardware, or firmware form. In one embodiment, the cadence detection module 302 is implemented in software form that includes a plurality of software instructions stored in a memory or storage device and executed by a single processing device or a plurality of processing devices (e.g., a microprocessor, co-processors, a microcontroller, digital signal processor, microcomputer, or central processing unit).

In another embodiment, the cadence detection module 302 is implemented in firmware form. In this case, the cadence detection module 302 is a circuit design template created using an electronic design automation tool. The circuit design template can then be finalized with user specified circuit parameters and is then programmed or implemented on a field programmable gate array (FPGA) or other physical programmable target device. In a further embodiment, the cadence detection module 302 is implemented in hardware form.

Figure 4:
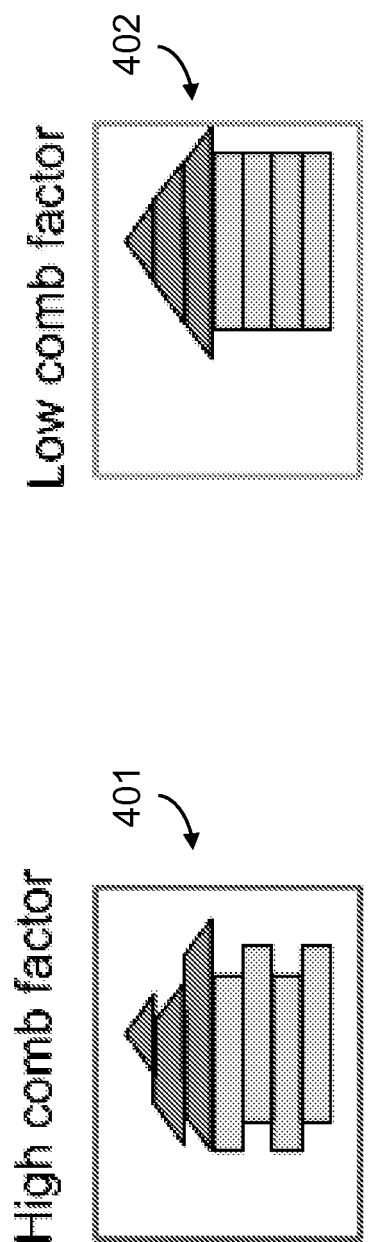
FIG. 4 illustrate a high comb factor frame and a low comb factor frame in accordance with one embodiment of the present invention.

FIG. 4 illustrate a high comb factor frame 401 and a low comb factor frame 402 in accordance with one embodiment of the present invention. As can be seen from FIG. 4, the high comb factor frame 401 has a comb factor value of high while the low comb factor frame 402 has a comb factor value of low. The reason that the high comb factor frame 401 has the high comb factor value while the low comb factor frame 402 has the low comb factor value is that the frame 401 is obtained from two incorrect fields while the frame 402 is obtained from two correct fields. As can be seen from FIG. 4, the frame 401 includes the combing effect (i.e., comb-shaped patterns or jagged edges) at various places in the frame. The combing effect is caused by the alternate lines in the frame 401 being slightly displaced from each other. For a frame with no motion detected, the main cause of the displacement is that at least one of the two fields used to form the frame 401 is not the appropriate or correct field.

Figure 5:
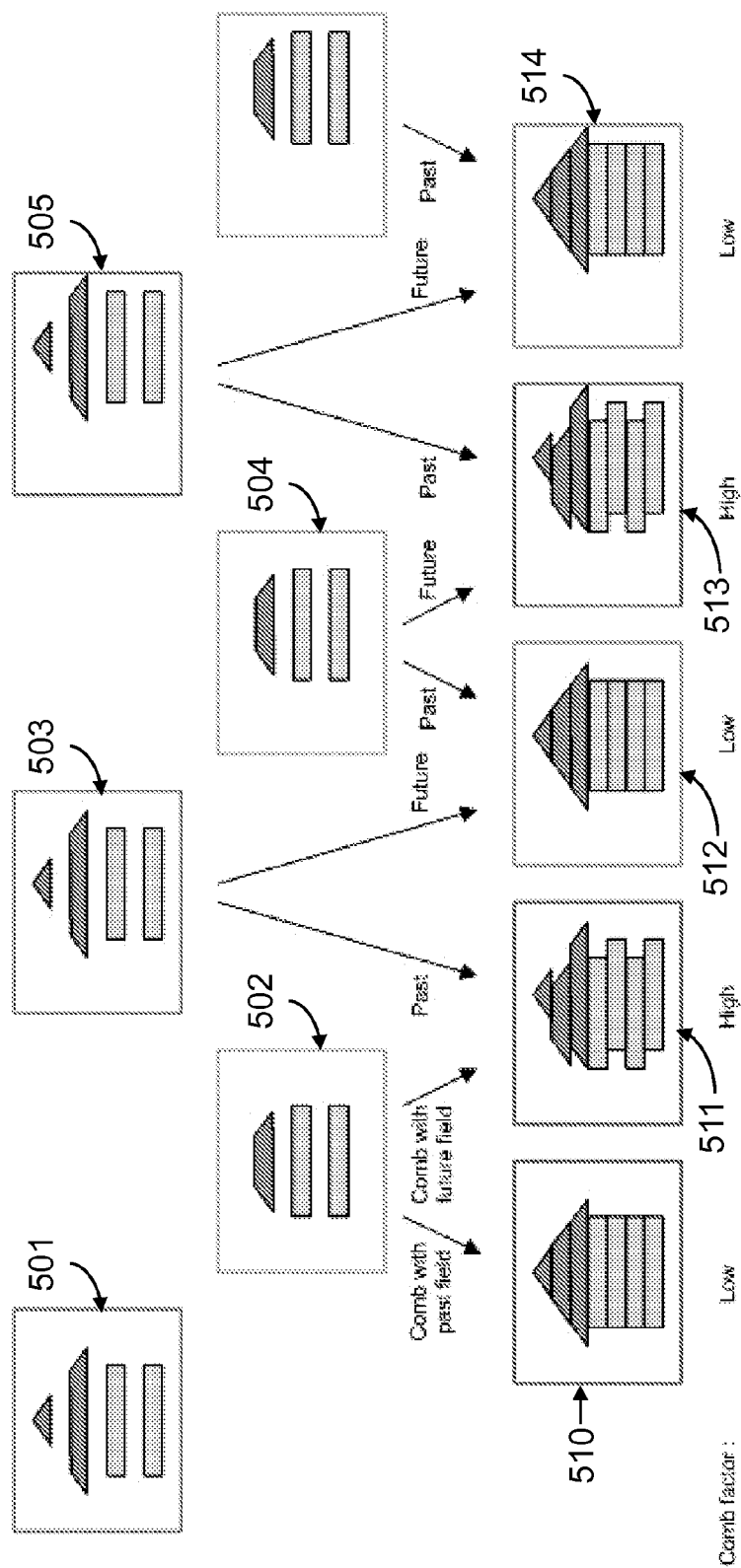
FIG. 5 illustrates a flow of a two-field-pair comparison arrangement to obtain a comb factor sequence for cadence detection according to an exemplary embodiment of the present invention.

FIG. 5 illustrates the flow of a two-field-pair comparison arrangement to obtain a comb factor sequence for cadence detection according to an exemplary embodiment of the present invention. This flow represents and illustrates the cadence detection function of the cadence detection module 302 of FIG. 3. As can be seen from FIG. 5, a sequence of interlaced fields 501-505 is shown with the fields 501, 503 and 505 represent the odd fields and the fields 502 and 504 represent the even fields.

When the field 502 is classified as the current field, two frames (i.e., frame 510 and frame 511) are obtained and added to the combined frame sequence. In this case, the frame 510 is the current frame and the frame 511 is classified as the future frame for the current field 502. When the field 503 is classified as the current field, two frames (i.e., frame 511 and frame 512) are obtained for the field 503. Since frame 511 has already been obtained, there is no need to duplicate it and thus only the frame 512 is added to the combined frame sequence. This way, the combined frame sequence 510-514 is obtained from the fields 501-505.

Then the comb factor of each of the combined frames in the sequence is determined to obtain a comb factor sequence. As can be seen from FIG. 5, the comb factor sequence follows a low-high-low-high repeating pattern. When this repeating pattern has exceeded a threshold length, the cadence detection module (e.g., the cadence detection module 302 of FIG. 3) can declare the detection of cadence for the interlaced video that includes fields 501-505.

Figure 6:
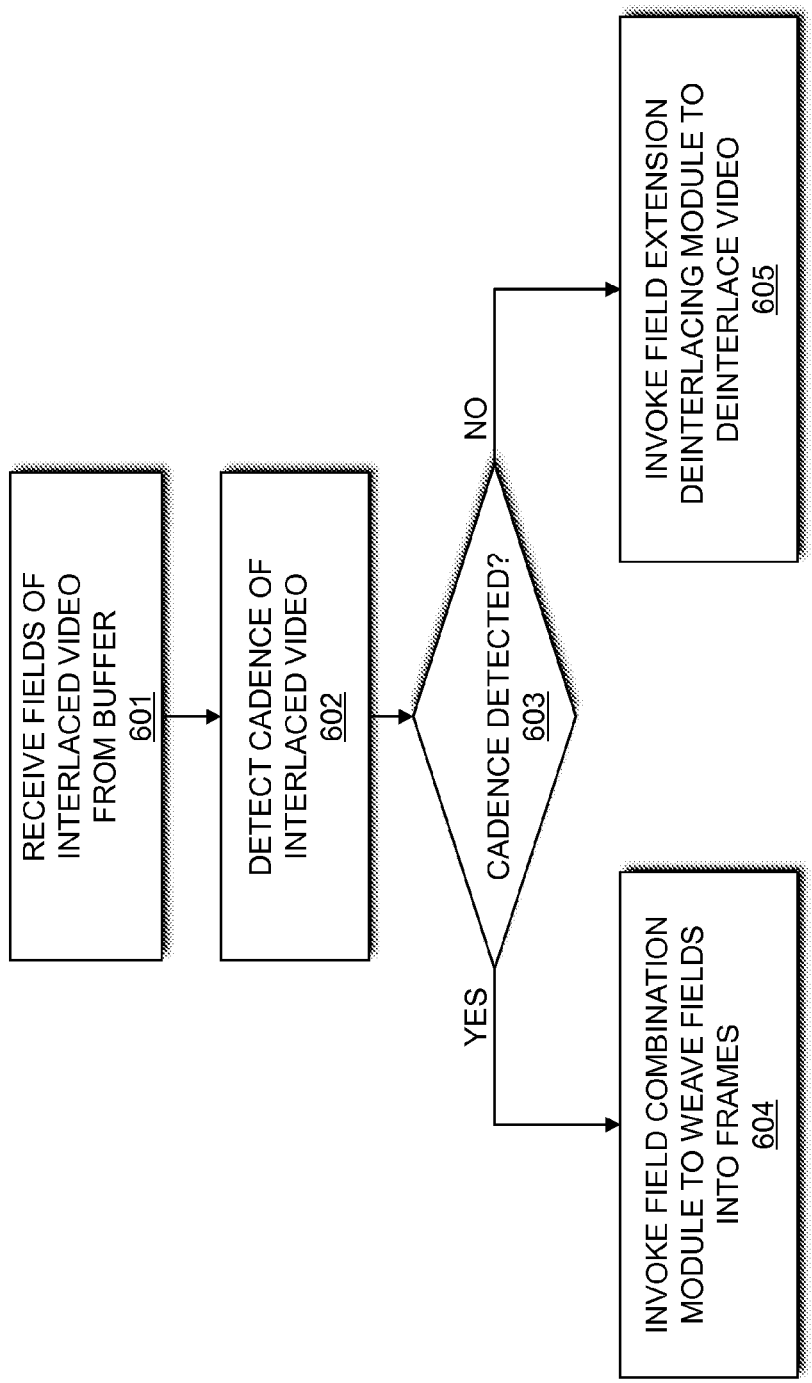
FIG. 6 illustrates a procedure performed by a cadence detection module to detect cadence of an interlaced video according to an exemplary embodiment of the present invention, wherein the procedure includes a two-field-pair comparison cadence detection function.

FIG. 6 illustrates a procedure performed by a cadence detection module to detect cadence of an interlaced video according to an exemplary embodiment of the present invention. The procedure illustrated in FIG. 6 may be performed by the cadence detection module 302 of FIG. 3 implemented by the field combination deinterlacing module 203. According to an embodiment of the present invention, the field extension deinterlacing module 202 (shown in FIG. 2) is capable of weaving parts of an image in addition to extending (interpolating) pixels. The procedure of FIG. 6 includes a two-field-pair comparison cadence detection function 602 in accordance with one embodiment of the present invention.

The procedure starts at 601 at which fields of the interlaced video is received from a buffer (or cache, storage, or memory). The buffer that receives the fields can be implemented in many different ways. For example, the buffer can be a line buffer for a motion detector (e.g., the motion detector 201 of FIG. 2) that detects if the interlaced video includes motion. As another example, the buffer can be implemented by a memory circuitry in the cadence detector (e.g., the cadence detection module 302 of FIG. 3). The received fields are consecutive in time and are adjacent to each other. At any given timing (i.e., time point), the fields include a current field (i.e., current with respect to the giving timing) and a preceding field (prior to the current field at the giving timing) which is immediately adjacent to the current field. The fields also include a subsequent field which immediately follows the current field and is adjacent to the current field.

At 602, the cadence of the interlaced video is detected. This is done using a two-field-pair comparison cadence detection scheme according to an exemplary embodiment of the present invention. Employing this two-field-pair comparison cadence detection scheme, there will be two comb factor metrics calculated for every incoming video field, one between the current field and the preceding (or prior or past) field and the other between the current field and the subsequent (or next) field. The comb factor values are then added or logged to a comb factor sequence count to accumulate the length of the sequence. Once the sequence has reached or exceeded a predetermined threshold length, it indicates that the sequence is sufficiently long for the cadence detection. At this time, the procedure determines if the comb factor sequence includes a repeating pattern of high-low-high-low (or low-high-low-high). If that is the case, a 2:2 cadence is detected. If not, then no 2:2 cadence is detected. This two-field-pair comparison cadence detection scheme will be described in more detail below, also in conjunction with FIG. 7.

At 603, it is determined whether the cadence of the interlaced video is detected. If the cadence is detected, control proceeds to 604. If the cadence is not detected, control proceeds to 605.

At 604, the procedure invokes a field combination module (e.g., the field combination module 303 of FIG. 3) to weave the fields into frames according to the detected cadence.

At 605, the procedure invokes a field extension deinterlacing module (e.g., the field extension deinterlacing module 202 of FIG. 2) to deinterlace the interlaced video.

Figure 7:
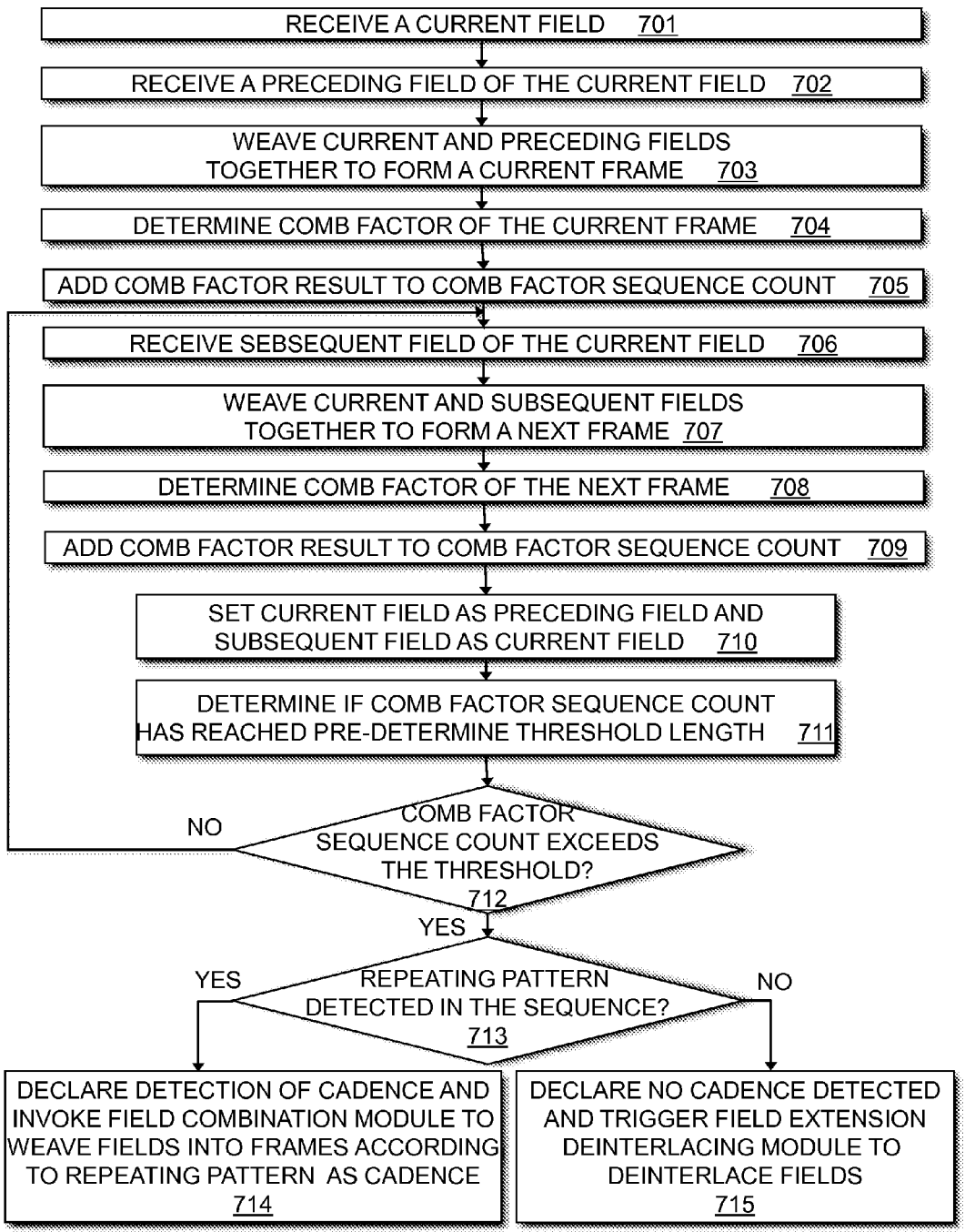
FIG. 7 illustrates a procedure for performing a two-field-pair comparison cadence detection according to an exemplary embodiment of the present invention.

FIG. 7 illustrates a procedure for performing the two-field-pair comparison cadence detection according to an exemplary embodiment of the present invention. This procedure can be performed by the cadence detection module 302 of FIG. 3 and can implement portion of the cadence detection function 602 of FIG. 6. The procedure starts at 701 to identify or receive a current field of an interlaced video for deinterlacing. The current field may have already been received as a subsequent field of another field that precedes the current field. Alternatively, the current field may have been just received.

At 702, the preceding field of the current field is received or identified. The preceding field is a field that is immediately prior to the current field.

In one embodiment, the preceding field has already been received and is previously the current field that has been reclassified as the preceding field of this new current field. In one embodiment, the preceding and current fields are received and stored consecutively in a line buffer of a motion detector (e.g., the motion detector 201 of FIG. 2). In another embodiment, the fields are received and stored in a buffer of a field combination deinterlacing module (e.g., the field combination deinterlacing module 203 of FIG. 2 or the buffer 301 of FIG. 3). Moreover, the blocks 701 and 702 may not need to be performed separately and may be an integrated function block.

At 703, the current and preceding fields are combined or weaved together to form a current frame, according to one embodiment. Alternatively, other field combination (e.g., blending) techniques can be used to combine the fields together.

At 704, the comb factor of the current frame is determined. As is described above, the comb factor is an accumulated metric for the combing values of all the pixels in the frame. In this case, the comb factor is an accumulated indication of the combing effect of all the pixels of the image frame.

In one embodiment, the comb factor is calculated as follows. For each pixel in a line, the procedure determines if the value of that pixel falls outside the range of a vertically interpolated pixel value. If it is determined that the value falls outside the range, then a high combing value is logged for that pixel (meaning displacement of the pixel that resulted in combing effect for that pixel). If it is determined that the value does not fall outside the range, then a low combing value is logged for that pixel. The interpolated pixel value is obtained by interpolate the pixel in question with its vertically adjacent pixels (i.e., a pixel above the pixel in question and a pixel below the pixel in question).

Once the combing value of all the pixels along the line has been calculated, the combing values for the next line of pixels are calculated using the above described procedure until all the pixels within the image frame have been processed. After this is completed, all the high combing values are accumulated to determine the comb factor of the image frame. If the accumulated comb factor value exceeds a pre-determined threshold, then a high comb factor result will be recorded for the frame. This indicates that the frame has high collective combing effect. If the accumulated comb factor value does not exceed the threshold, then a low comb factor result will be recorded for the image. This indicates that the collective combing effect of the frame is either very low or the frame does not have any combing effect.

At 705, the comb factor result is recorded by a comb factor sequence count. It is to be noted that blocks 701 to 705 will only need to be performed once initially the first time as the future frame for the current field will be the current frame for the subsequent field as the next current field.

At 706, a subsequent field of the current field is identified or received. The subsequent field immediately follows the current field. In one embodiment, the subsequent field is also received and stored in a line buffer of a motion detector (e.g., the motion detector 201 of FIG. 2). In another embodiment, the subsequent field is received and stored in a buffer of a field combination deinterlacing module (e.g., the field combination deinterlacing module 203 of FIG. 2 or the buffer 301 of FIG. 3).

At 707, the current and subsequent fields are combined or weaved together to form a next frame, according to one embodiment. Alternatively, other field combination (e.g., blending) techniques can be used to combine the fields together.

At 708, the comb factor of the next frame is determined. As is described above, the comb factor is an accumulated metric for the combing values of all the pixels in the frame. The determination procedure for the comb factor of the next frame is the same as that for the comb factor of the current frame. The comb factor result can be high (indicating that the collective combing effect of the frame is high) and low (indicating that the collective combing effect of the frame is low or there is no combing effect for the frame).

At 709, the comb factor result is recorded in the comb factor sequence count.

At 710, the procedure moves onto the next field. Thus at 710, the subsequent field is set to be the current field and the current field is set to be the preceding field.

At 711, the procedure determines if the comb factor sequence count has reached a pre-determined threshold length. The pre-determined threshold length can be, for example, ten times (i.e., ten comb factor value pairs). A longer pre-determined threshold length will make the cadence detection more reliable, but will also mean a longer latency in the detection.

At 712, it is determined whether the comb factor sequence count has exceeded the pre-determined threshold length. If the comb factor sequence count has exceeded the threshold length, the comb factor sequence is sufficiently long for cadence detection and control proceeds to 713. If it is determined that the comb factor sequence count has not exceeded the threshold length, more comb factor values are needed for the sequence to be used for cadence detection and control returns to 706.

At 713, it is determined whether the comb factor sequence includes a repeating comb factor pattern of high-low-high-low (or low-high-low-high). If the comb factor sequence includes a repeating comb factor pattern, the 2:2 cadence is detected and control proceeds to 714. If the comb factor sequence does not include a repeating comb factor pattern, no 2:2 cadence is detected and control proceeds to 715.

At 714, the cadence is declared detected and the procedure invokes the field combination module (e.g., the field combination module 303 of FIG. 3) to combine or weave the fields into progressive frames in accordance with the detected cadence.

At 715, the procedure declares that no 2:2 cadence is detected and the field extension deinterlacing module (e.g., the field extension deinterlacing module 202 of FIG. 2) is triggered or invoked to deinterlace the fields into progressive frames.

Figure 8:
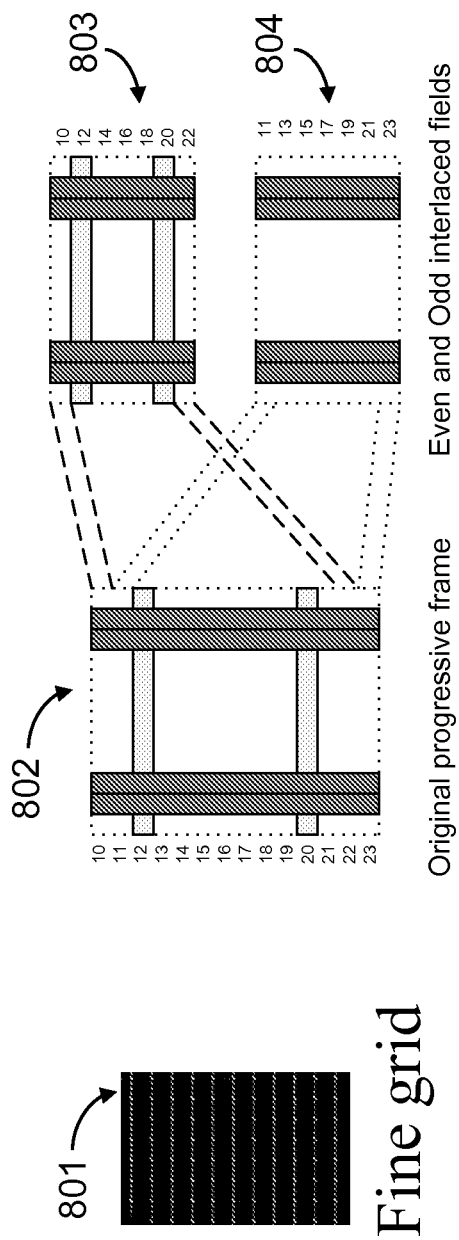
FIG. 8 illustrates a fine grid-like pattern frame interlaced into an even field and an odd field.
Figure 9:
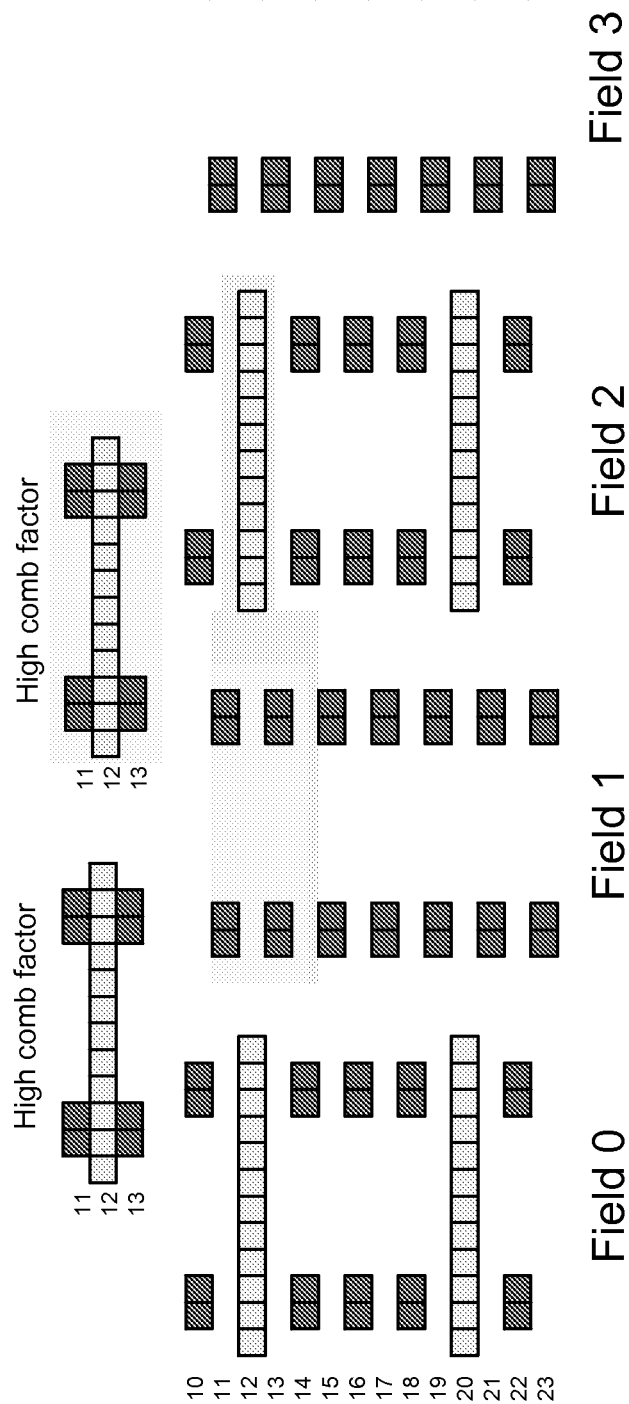
FIG. 9 shows the comb factor sequence obtained for the fine grid-like pattern of FIG. 8 using the two-field-pair comparison cadence detection according to an exemplary embodiment of the present invention.

FIGS. 8 and 9 illustrate the robustness of the two-field-pair comparison cadence detection scheme described above with respect to FIGS. 2-7. The robustness of the cadence detection scheme refers to the fact that the scheme is less likely to erroneously lock to non-cadenced video sequences. In other words, using the two field-pair comparison cadence detection scheme for obtaining comb factor sequence to detect the cadence reduces the possibility of detecting cadence erroneously when compared with schemes which only perform one field-pair comparison for cadence detection.

FIG. 8 illustrates a fine grid-like pattern frame 802 interlaced into an odd field 803 and an even field 804. The fine grid-like pattern frame 802 is an original progressive frame of a fine grid pattern 801. FIG. 9 shows the comb factor sequence obtained for the fine grid-like pattern 801 of FIG. 8 using the two-field-pair comparison cadence detection scheme according to an exemplary embodiment of the present invention. As can be seen from FIG. 8, the horizontal lines are featured on odd numbered fields (see odd field 803) for the fine grid-like pattern 801.

As can be seen from FIG. 9, employing the two-field-pair comparison cadence detection according to an exemplary embodiment of the present invention, the comb factor of field 1 (regarded as the current field) is computed with both field 0 (preceding field) and field 2 (i.e., subsequent field). As can be seen from FIG. 9, only lines of the same type (i.e., either odd lines or even lines) are compared with the same type of lines. The comb factors for the two combined frames (i.e., fields 0 and 1 as current frame and fields 1-2 as next frame) are obtained. The comb factor pair, in this case, is high and high.

The comb factor of field 2 (regarded as the current field at this time) is then computed with both field 1 (preceding field at this time) and field 3 (regarded as subsequent field at this time). This is illustrated in FIG. 9. Only lines of the same type are compared with the same type of lines to calculate the comb factor. In this case, the comb factors for the two combined frames (i.e., fields 1 and 2 as current frame and fields 2 and 3 as next frame) are obtained to be low and low. This process is repeated for subsequent fields.

The comb factor sequence obtained for fields 1 and 2 is high, high, low, low. Because this sequence is not a high-low-high-low (or low-high-low-high) sequence, the comb factor sequence count is not recording a high-low-high-low (or low-high-low-high) sequence and will not increment its high-lowhigh-low (or low-high-low-high) sequence count. But if a one-field-pair comparison is used to obtain the comb factor sequence, then a high-low-high-low (or low-high-low-high) sequence will be obtained, which falsely represents a detection of cadence. Thus, the two-field-pair comparison scheme in accordance with one embodiment of the present invention is robust and will not falsely lock to non-cadenced video sequences.

Figure 10:
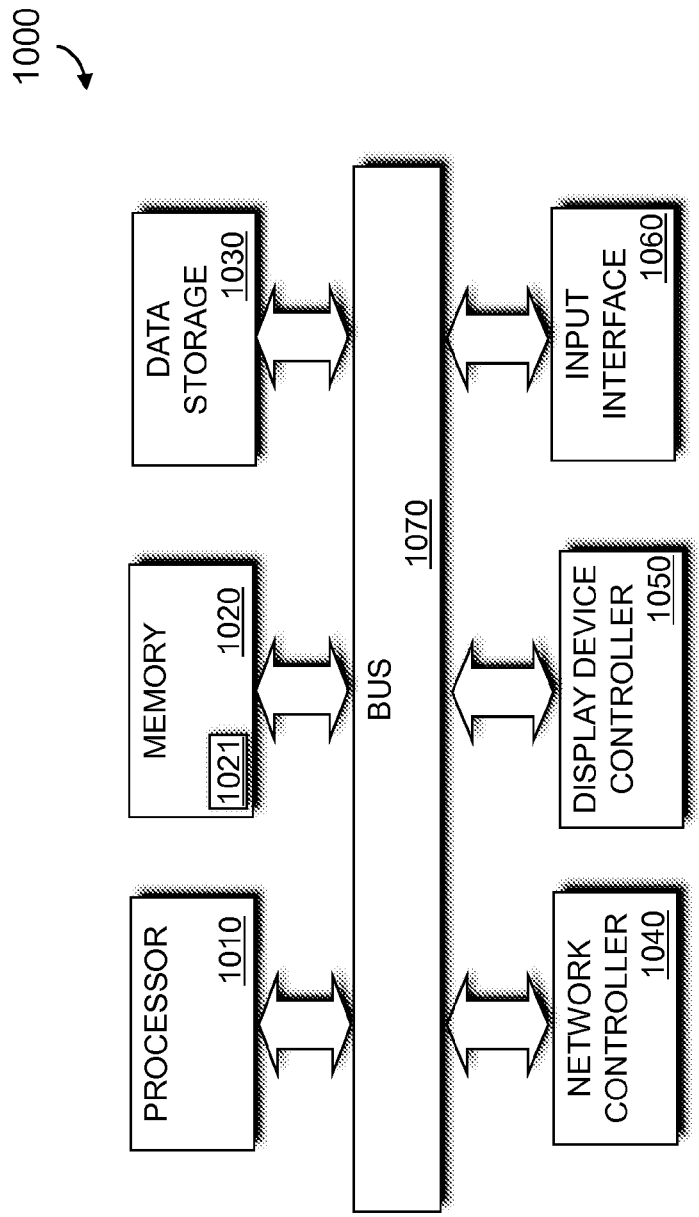
FIG. 10 illustrates a block diagram of a computer system that may be used to implement cadence detection of an interlaced video according to one exemplary embodiment of present invention.

FIG. 10 is a block diagram of an exemplary computer system 1000 in which an example embodiment of the present invention resides. The computer system 1000, along with corresponding software program code stored in the system 1000, may be used to implement the deinterlacer 200, the field combination deinterlacing module 203, and/or the cadence detection module 302 shown in FIGS. 2-3. The computer system 1000 includes a processor 1010 that executes instructions and processes data. The processor 1010 is coupled to a CPU bus 1070 that transmits data and instructions between components and modules of the computer system 1000. The bus 1070 may be a single bus or a combination of multiple buses.

The computer system 1000 also includes a memory 1020, data storage 1030, a network controller 1040, a display device controller 1050, and an input interface 1060. The memory 1020 may be a dynamic random access memory, a static random access memory, and/or other types of memory (e.g., flash memory). The memory 1020 may store instructions and code 1021 executed by the processor 1010. The data storage 1030 is coupled or connected to the bus 1100. The data storage 1030 may be a hard disk drive, a CD-ROM drive, a flash memory device, and/or other types of nonvolatile mass storage devices.

The network controller 1040 is coupled or connected to the bus 1070. The network controller 1040 may link the computer system 1000 to a network of computers (not shown) and supports communication among the computers. The display device controller 1050 is also coupled or connected to the bus 1100. The display device controller 1050 allows coupling of a display device (not shown) to the computer system 1000 and acts as an interface between the display device and the computer system 1000.

The input interface 1060 is coupled or connected to the bus 1070. The input interface 1060 may be, for example, a keyboard and/or cursor control device (e.g., mouse). The input interface 1060 may also be a touch screen input interface, in one embodiment. In this case, the display device controller 1050 and the input interface 1060 may be integrated together as an integrated unit. The input interface 1060 allows for input data and instructions to be transmitted from an input device to the computer system 1000. It should be appreciated that the computer system 1000 may be implemented with different architecture or has more or fewer or different components than those shown in FIG. 10.

FIGS. 6-7 are flow charts illustrating methods according to embodiments of the present invention. The techniques illustrated in these figures may be performed sequentially, in parallel or in an order other than what is described. The techniques may be also be performed one or more times. It should be appreciated that not all of the techniques described are required to be performed, that additional techniques may be added, and that some of the illustrated techniques may be substituted with other techniques.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, or encoding a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for processing interlaced video, comprising:
   combining each field in a plurality of consecutive fields of the interlaced video to be combined with its preceding field into a frame and with its subsequent field into another frame to obtain a plurality of combined frames;
   determining a comb factor of each of the combined frames to obtain a sequence of comb factors of the combined frames by determining a comb factor value of each pixel in the frame and accumulating the comb factor value over all of the pixels within the frame to obtain the comb factor of that frame, and declaring the comb factor of a combined frame to be a high value if the accumulated comb factor value over all the pixels within the combined frame exceeds a pre-determined threshold while declaring the comb factor of the combined frame to be a low value if the accumulated comb factor value does not exceed the pre-determined threshold; and
   determining if the sequence of comb factors of the combined frames follows a pre-determined repeating pattern.

2. The method of claim 1 further comprising declaring detection of cadence if the sequence of comb factors of the combined frames is determined to follow the pre-determined repeating pattern.

3. The method of claim 2 further comprising deinterlacing the interlaced video in response to the detected cadence using field combination.

4. The method of claim 1 further comprising detecting a 2:2 cadence if the sequence of comb factors is detected to follow a low-high-low-high repeating pattern for a pre-determined number of times.

5. The method of claim 1 further comprising declaring that no cadence is detected if the sequence of comb factors does not follow a low-high-low-high repeating pattern for a pre-determined number of times.

6. The method of claim 5 further comprising deinterlacing the interlaced video in response to a declaration that no cadence is detected.

7. The method of claim 1 wherein determining a comb factor value of each pixel in the frame comprises:
   interpolating a pixel vertically with a pixel above and a pixel below to generate an interpolated pixel for the pixel;
   determining whether the value of the pixel falls outside a pre-determined range of the interpolated pixel;
   declaring the value of the comb factor of the pixel to be high if the value of the pixel falls outside the pre-determined range of the interpolated pixel; and
   declaring the value of the comb factor of the frame to be low if the value of the pixel falls inside the pre-determined range of the interpolated pixel.

8. A non-transitory computer-readable medium having sequences of instructions, the sequences of instructions including instructions which, when executed, causes a processor to perform a method, comprising:
   combining each field in a plurality of consecutive fields of an interlaced video to be combined with its preceding field into a frame and with its subsequent field into another frame to obtain a plurality of combined frames;
   determining a comb factor of each of the combined frames to obtain a sequence of comb factors of the combined frames by determining a comb factor value of each pixel in the frame and accumulating the comb factor value over all of the pixels within the frame to obtain the comb factor of that frame, and declaring the comb factor of a combined frame to be a high value if the accumulated comb factor value over all the pixels within the combined frame exceeds a pre-determined threshold while declaring the comb factor of the combined frame to be a low value if the accumulated comb factor value does not exceed the pre-determined threshold; and
   determining if the sequence of comb factors of the combined frames follows a pre-determined repeating pattern.

9. The non-transitory computer-readable medium of claim 8 further comprising declaring detection of cadence if the sequence of comb factors of the combined frames is determined to follow the pre-determined repeating pattern.

10. The non-transitory computer-readable medium of claim 9 further comprising deinterlacing the interlaced video in accordance with the detected cadence using field combination.

11. The non-transitory computer-readable medium of claim 8 further comprising detecting a 2:2 cadence if the sequence of comb factors is detected to follow a low-high-low-high repeating pattern for a pre-determined number of times.

12. The non-transitory computer-readable medium of claim 8 further comprising declaring that no cadence is detected if the sequence of comb factors does not follow a low-high-low-high repeating pattern for a pre-determined number of times.

13. The non-transitory computer-readable medium of claim 12 further comprising deinterlacing the interlaced video in response to a declaration that no cadence is detected.

14. A motion adaptive deinterlacer, comprising:
   a motion detector to detect motion in an interlaced video that includes a plurality of consecutive fields;
   a field extension deinterlacing module to deinterlace the interlaced video if the motion detector detects motion in the interlaced video; and;
   a field combination deinterlacing module to deinterlace the interlaced video if the motion detector does not detect motion in the interlaced video and if cadence of the interlaced video is detected.

15. The motion adaptive deinterlacer of claim 1, wherein the field combination deinterlacing module comprises:
   a field combination module to deinterlace the interlaced video in accordance with the cadence of the interlaced video; and
   a cadence detection module to detect the cadence by (1) causing each of the fields to be combined with its preceding field into a frame and with its subsequent field into another frame to obtain a plurality of combined frames, (2) determining a comb factor of each of the combined frames to obtain comb factors of the combined frames in sequence, and (3) determining if the sequence of comb factors follows a pre-determined repeating pattern.

16. The motion adaptive deinterlacer of claim 2, wherein the cadence detection module determines the comb factor of each of the combined frames by determining a comb factor value of each pixel in the frame and accumulating the comb factor value over all of the pixels within the frame to obtain the comb factor of that frame, wherein if the accumulated comb factor value over all the pixels within the frame exceeds a pre-determined threshold, the cadence detection module declares the comb factor of that combined frame to be of a high value while if the accumulated comb factor value over all the pixels within the frame does not exceed the pre-determined threshold, the cadence detection module declares the comb factor of the combined frame to be of a low value.

17. The motion adaptive deinterlacer of claim 3, wherein the cadence detection module detects a 2:2 cadence if the sequence of comb factors is detected to follow a low-high-low-high repeating pattern for a pre-determined number of times.

18. The motion adaptive deinterlacer of claim 2, wherein the cadence detection module causes the field combination module to produce the combined frames, wherein the cadence detection module and the field combination module are coupled to a line buffer of the motion detector to receive all the fields of the interlaced video.

19. The motion adaptive deinterlacer of claim 3, wherein the cadence detection module declares that no cadence is detected if the sequence of comb factors does not follow a low-high-low-high repeating pattern for a pre-determined number of times.

20. The motion adaptive deinterlacer of claim 6, wherein if the cadence detection module does not detect the cadence of the interlaced video, the cadence detection module invokes the field extension deinterlacing module to deinterlace the interlaced video.

* * * * *